United States Patent
Hung et al.

(10) Patent No.: US 8,905,654 B2
(45) Date of Patent: Dec. 9, 2014

(54) NETWORK CAMERA

(71) Applicant: Sercomm Corporation, Taipei (TW)

(72) Inventors: Sung-Chun Hung, Taipei (TW); Cheng-Chung Chang, New Taipei (TW)

(73) Assignee: Sercomm Corporation, Taipei (TW)

(*) Notice: Subject to any disclaimer, the term of this patent is extended or adjusted under 35 U.S.C. 154(b) by 0 days.

(21) Appl. No.: 14/071,777

(22) Filed: Nov. 5, 2013

(65) Prior Publication Data

US 2014/0178062 A1 Jun. 26, 2014

(30) Foreign Application Priority Data

Dec. 26, 2012 (CN) .................. 2012 2 0728843 U

(51) Int. Cl.
G03B 17/00 (2006.01)
F16B 3/00 (2006.01)
F16M 11/14 (2006.01)
G06F 3/00 (2006.01)

(52) U.S. Cl.
CPC .................. F16B 3/00 (2013.01); F16M 11/14 (2013.01); G06F 3/005 (2013.01)
USPC .......................... 396/428; 396/424; 248/187.1

(58) Field of Classification Search
USPC ................ 396/419, 424, 427, 428; 248/187.1
See application file for complete search history.

(56) References Cited

U.S. PATENT DOCUMENTS

| | | | | |
|---|---|---|---|---|
| 6,481,681 B1* | 11/2002 | Stunkel et al. | ........... | 248/231.31 |
| 6,947,093 B2* | 9/2005 | Yanakawa et al. | ............ | 348/373 |
| 7,185,862 B1* | 3/2007 | Yang | .......................... | 248/187.1 |
| 7,389,964 B2* | 6/2008 | Ye | .............................. | 248/231.61 |
| 7,658,554 B2* | 2/2010 | Takahashi | ...................... | 396/427 |
| 7,736,071 B2* | 6/2010 | Wahl et al. | .................... | 396/419 |
| 8,317,152 B1* | 11/2012 | Zhou | .............................. | 248/596 |
| 2008/0159733 A1* | 7/2008 | Liang | ............................. | 396/428 |
| 2010/0155549 A1* | 6/2010 | Robinson | ................... | 248/183.1 |

* cited by examiner

Primary Examiner — Clayton E Laballe
Assistant Examiner — Warren K Fenwick
(74) Attorney, Agent, or Firm — McClure, Qualey & Rodack, LLP

(57) ABSTRACT

A network camera comprising a casing and a base is provided. The casing has a slot. The base comprises a supporter and a joint rod. The joint rod has a joint terminal and an engaging terminal. The joint terminal is pivotally connected to the supporter. The engaging terminal has an engaging flange engaged within the slot.

19 Claims, 3 Drawing Sheets

NETWORK CAMERA

This application claims the benefit of People's Republic of China application Serial No. 201220728843.X, filed on Dec. 26, 2012, the subject matter of which is incorporated herein by reference.

BACKGROUND

1. Field of the Invention

The invention relates in general to a network camera, and more particularly to a network camera capable of resolving loosening problem of embedded nuts.

2. Related Art

In conventional network camera, a nut is embedded in the casing, and the joint of the base is locked to the embedded nut to be fixed on the casing. During the injection molding process of forming the casing, the nut is generally placed within the cavity in advance, and then is encapsulated within the casing after the casing material is ejected to the cavity. However, such process may easily result in poor combination between the nut and the casing, such that the nut may loose and rotate when the joint of the base is locked to the nut.

SUMMARY

An embodiment of the present invention provides a network camera, comprising a casing and a base. The casing has a slot. The base comprises a supporter and a joint rod. The joint rod has a joint terminal and an engaging terminal, wherein the joint terminal is pivotally connected to the supporter, and the engaging terminal has an engaging flange engaged within the slot.

The above and other aspects of the invention will become better understood with regard to the following detailed description of the embodiment(s). The following description is made with reference to the accompanying drawings,

DETAILED DESCRIPTION OF THE INVENTION

Figure 1:
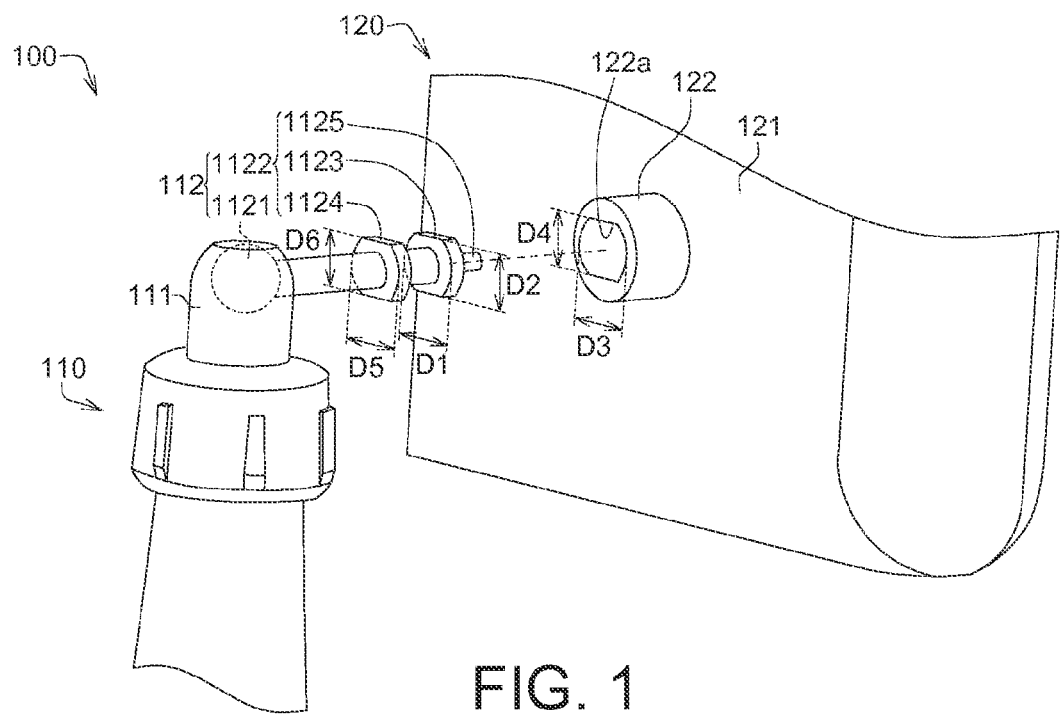
FIG. 1 is an appearance diagram of a network camera according to an embodiment of the present invention.

Referring to FIG. 1, an appearance diagram of a network camera according to an embodiment of the present invention is shown. The network camera 100 comprises a base 110 and a casing 120.

The base 110 comprises a supporter 111 and a joint rod 112. The joint rod 112 has a joint terminal 1121 and an engaging terminal 1122, wherein the joint terminal 1121 is pivotally connected to the supporter 111. In the present embodiment, the joint rod 112 is a universal joint rod, and the joint terminal 1121 is such as a ball joint, but the present invention is not limited thereto.

Figure 2:
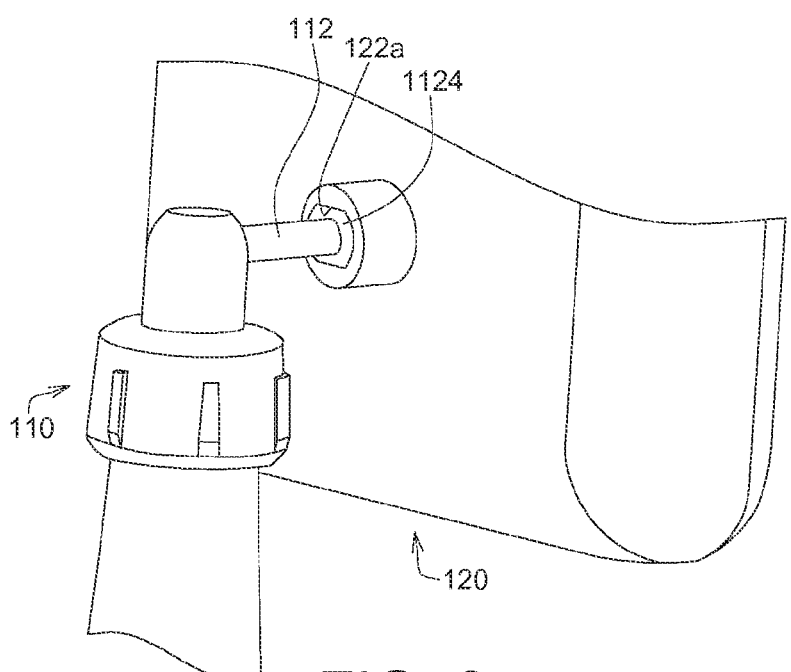
FIG. 2 is a schematic diagram of a joint rod of FIG. 1 disposed on a casing.

The casing 120 comprises a side board 121 and a protruding portion 122. The protruding portion 122 protrudes from the side board 121, and has an opening 122a which has a second large diameter D3 and a second small diameter D4. The engaging terminal 1122 comprises an engaging flange 1123, which has a first large diameter D1 and a first small diameter D2. The engaging flange 1123 is disposed in the opening 122a with the first large diameter D1 being aligned with the second large diameter D3 of the opening 122a and the first small diameter D2 being aligned with the second small diameter D4 of the opening 122a. Thus, the large diameters and the small diameters ensure that the joint rod 112 can be correctly fabricated on the casing 120 as indicated in FIG. 2. FIG. 2 is a schematic diagram of the joint rod of FIG. 1 disposed on the casing. In an embodiment, the cross-sectional shape of the engaging flange 1123 is such as elliptical or polygonal or other suitable shapes. In another embodiment, the cross-sectional shape of the engaging flange 1123 can be circular with equal diameter, and the opening 122a can be realized by a corresponding round hole.

The engaging terminal 1122 further comprises a positioning flange 1124. The positioning flange 1124 has a first large diameter D5 and a first small diameter D6. The positioning flange 1124 is disposed in the opening 122a with the first large diameter D5 being aligned with the second large diameter D3 of the opening 122a and the first small diameter D6 being aligned with the second small diameter D4 of the opening 122a. Thus, the large diameters and the small diameters ensure that the joint rod 112 can be correctly disposed on the casing 120 as indicated in FIG. 2. Besides, the opening 122a can limit the displacement of the positioning flange 1124 to prevent the joint rod 112 from wobbling.

Figure 3:
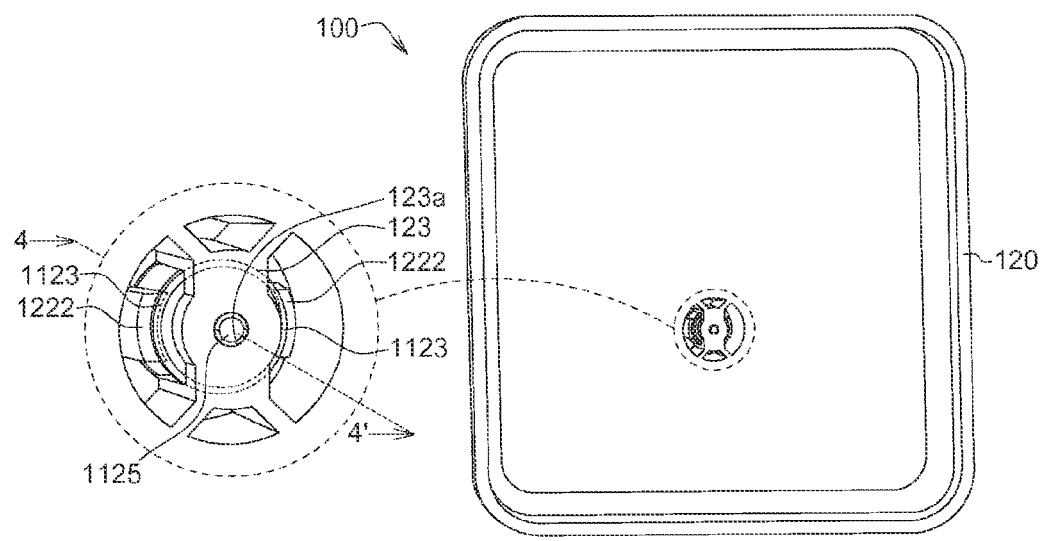
FIG. 3 is a rear view of FIG. 2.
Figure 4:
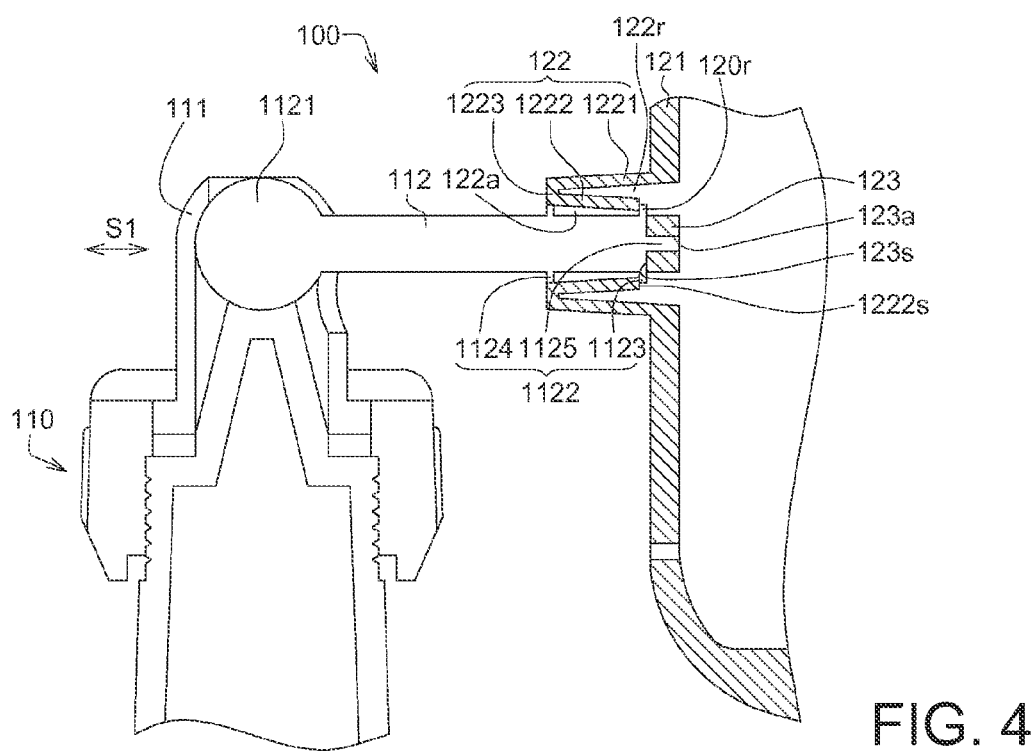
FIG. 4 is a partial cross-sectional view along direction 4-4' of FIG. 3.

Referring to FIG. 3 and FIG. 4. FIG. 3 is a rear view of FIG. 2. FIG. 4 is a partial cross-sectional view along direction 4-4' of FIG. 3. The casing 120 has a slot 120r, the joint rod 112 is firmly engaged within the slot 120r of the casing 120 by the engaging flange 1123.

The protruding portion 122 comprises an outer ring wall 1221, an inner ring wall 1222 and a first terminal wall 1223. The first terminal wall 1223 connects the inner ring wall 1222 and the outer ring wall 1221. A recess 122r is formed among the outer ring wall 1221, the inner ring wall 1222 and the first terminal wall 1223. The recess 122r can reduce the stiffness of the protruding portion 122 and increase the flexibility of the inner ring wall 1222. Thus, during the process of the engaging terminal 1122 entering the opening 122a and contacting the inner ring wall 1222, the inner ring wall 1222 is flexibly deformed such that the engaging terminal 1122 can easily enter the opening 122a.

As indicated in FIG. 3, the inner ring wall 1222 is a sheet which provides flexibility. In addition, the quantity of inner ring wall 1222 can be two. In another embodiment, the quantity of inner ring wall 1222 can be more than two, and can be separately disposed.

The casing 120 further comprises a stopping portion 123. The slot 120r is formed between the stopping portion 123 and the terminal surface 1222s of the inner ring wall 1222. The displacement of the engaging flange 1123 is limited by the slot 120r formed between the stopping portion 123 and the terminal surface 1222s of the inner ring wall 1222. When the engaging terminal 1122 is engaged within the slot 120r, the engaging flange 1123 may contact or may not contact the terminal surface 123s of the stopping portion 123 and the terminal surface 1222s of the inner ring wall 1222. The interval between the terminal surface 123s of the stopping portion 123 and the terminal surface 1222s of the inner ring wall 1222 is substantially equal to or smaller than the thickness of the engaging flange 1123. As a result, the engaging flange 1123 can be tightly engaged within the slot 120r (the engaging flange 1123 contacts the terminal surface 123s of the stopping portion 123 and/or 1222s of the inner ring wall 1222).

In addition, the inner ring wall 1222 is such as a conical ring wall having an inner diameter gradually shrinks in a direction towards the slot 120r from the first terminal wall 1223. Thus, during the process of the engaging flange 1123 contacting the inner ring wall 1222, the inner diameter of the inner ring wall 1222 is expanded and deformed. After the engaging flange 1123 enters the slot 120r, the inner ring wall 1222 is rebound to stop the engaging flange 1123.

Figure 5:
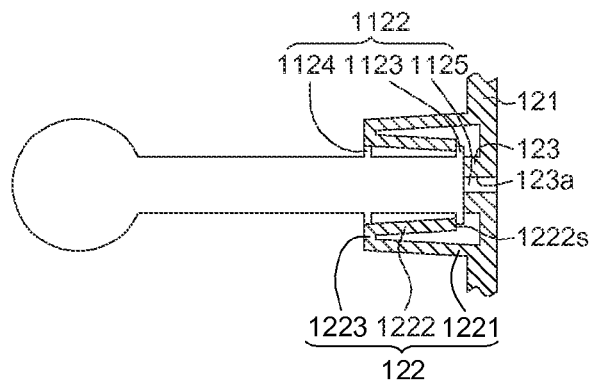
FIG. 5 is a partial cross-sectional view along another direction of FIG. 3.

Referring to FIG. 5, a partial cross-sectional view along another direction of FIG. 3 is shown, The stopping portion 123 is connected to the side board 121, the inner ring wall 1222 or the outer ring wall 1221 to prevent the stopping portion 123 from coming off. In addition, the stopping portion 123 has a through hole 123a, and the engaging terminal 1122 has a protruding terminal portion 1125 passing through the through hole 123a of the stopping portion 123. The through hole 123a can limit the displacement of the protruding terminal portion 1125 to prevent the joint rod 112 from wobbling.

Figure 6A:
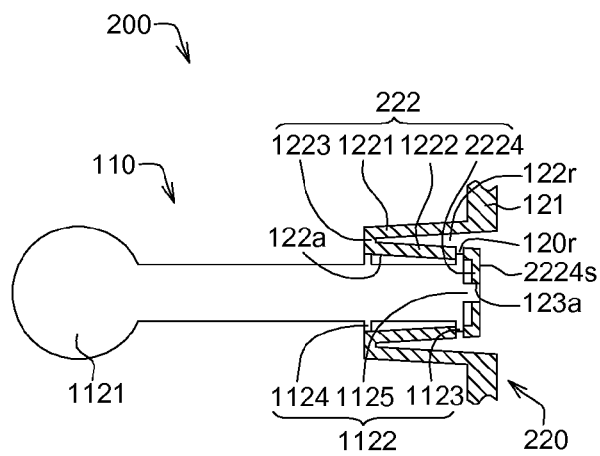
FIG. 6A is a partial cross-sectional view of a network camera according to another embodiment of the present invention.

Referring to FIG. 6A, a partial cross-sectional view of a network camera according to another embodiment of the present invention is shown. The network camera 200 comprises a base 110 and a casing 220.

Figure 6B:
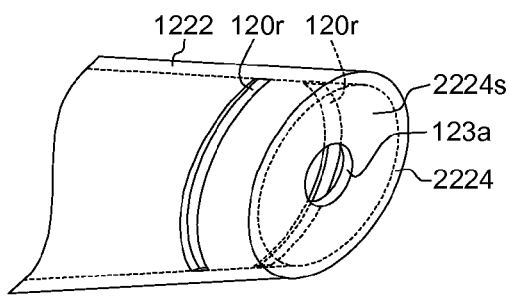
FIG. 6B is an appearance diagram of an inner ring wall of FIG. 6A.

The casing 220 comprises a side board 121 and a protruding portion 222. The protruding portion 222 is disposed on and protruded from the side board 121. The protruding portion 222 comprises an outer ring wall 1221, an inner ring wall 1222, a first terminal wall 1223 and a second terminal wall 2224 opposite to the first terminal wall 1223. The first terminal wall 1223 connects the inner ring wall 1222 and the outer ring wall 1221, and the second terminal wall 2224 connects the inner ring wall 1222 (as illustrated in FIG. 6B). In addition, the inner ring wall 1222 and the second terminal wall 2224 form a suspended beam to increase the flexibility of the inner ring wall 1222.

A recess 122r is formed among the outer ring wall 1221, the inner ring wall 1222 and the first terminal wall 1223. The recess 122r can reduce the stiffness of the protruding portion 222 and increase the flexibility of the inner ring wall 1222. Thus, during the process of the engaging terminal 1122 entering the opening 122a and expanding the inner ring wall 1222, the inner ring wall 1222 is flexibly deformed such that the engaging flange 1123 can easily enter the slot 120r.

The casing 220 has a slot 120r. The slot 120r is formed on the inner ring wall 1222 but is not extended to the terminal surface 2224s of the second terminal wall 2224, such that the engaging flange 1123 can be engaged within the slot 120r. Besides, the second terminal wall 2224 has the through hole 123a, and the engaging terminal 1122 has a protruding terminal portion 1125 passing through the through hole 123a of the second terminal wall 2224. The through hole 123a can limit the displacement of the protruding terminal portion 1125 to prevent the joint rod 112 from wobbling.

Referring to FIG. 6B, an appearance diagram of an inner ring wall of FIG. 6A is shown. In the present embodiment, the slot 120r is an open ring-shaped slot, such that the second terminal wall 2224 is connected to the inner ring wall 1222 to prevent the second terminal wall 2224 from being separated from the inner ring wall 1222.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network camera, comprising:
   a casing, having a slot, wherein the casing comprises:
   a side board; and
   a protruding portion protruding from the side board and comprising:
   an outer ring wall;
   an inner ring wall; and
   a first terminal wall connecting the inner ring wall and the outer ring wall, wherein a recess is formed among the outer ring wall, the inner ring wall and the first terminal wall; and
   a base, comprising:
   a supporter; and
   a joint rod, having a joint terminal and an engaging terminal, wherein the joint terminal is pivotally connected to the supporter, and the engaging terminal has an engaging flange engaged within the slot.

2. The network camera according to claim 1, wherein the joint rod is a universal joint rod.

3. The network camera according to claim 1, wherein the joint terminal is a ball joint.

4. The network camera according to claim 1, wherein the casing further comprises:
   a stopping portion, wherein the slot is formed between the stopping portion and a terminal portion of the inner ring wall.

5. The network camera according to claim 4, wherein the stopping portion connects the side board or the outer ring wall.

6. The network camera according to claim 4, wherein the stopping portion has a through hole, the engaging terminal comprises a protruding terminal portion, which passes through the through hole of the stopping portion.

7. The network camera according to claim 1, wherein an inner diameter of the inner ring wall gradually shrinks along a direction towards the slot from the first terminal wall.

8. The network camera according to claim 1, wherein the protruding portion further comprises:
   a second terminal wall connected to the inner ring wall;
   wherein the slot is formed on the inner ring wall and is not extended to a terminal surface of the second terminal wall.

9. The network camera according to claim 8, wherein the slot is an open ring-shaped slot.

10. The network camera according to claim 1, wherein the engaging flange directly contacts a terminal surface of the inner ring wall.

11. The network camera according to claim 10, wherein the engaging terminal comprises a positioning flange, the positioning flange has a first large diameter and a first small diameter, and the protruding portion of the casing has an opening, wherein the opening has a second large diameter and a second small diameter;
   wherein, the positioning flange is disposed in the opening with the first large diameter being aligned with the second large diameter of the opening and the first small diameter being aligned with the second small diameter of the opening.

12. The network camera according to claim 1, wherein the engaging flange has a first large diameter and a first small diameter, and the protruding portion has an opening which has a second large diameter and a second small diameter;

wherein, the engaging flange is disposed in the opening with the first large diameter being aligned with the second large diameter of the opening and the first small diameter being aligned with the second small diameter of the opening.

13. A network camera, comprising:
a casing, comprising:
a side board; and
a protruding portion protruding from the side board, the protruding potion having an opening and a slot; and
a base, comprising:
a supporter; and
a joint rod, having a joint terminal and an engaging terminal, wherein the joint terminal is pivotally connected to the supporter, the engaging terminal is engaged within the opening, and the engaging terminal has an engaging flange engaged within the slot.

14. The network camera according to claim 13, wherein the protruding portion comprises:
an outer ring wall;
an inner ring wall; and
a first terminal wall connecting the inner ring wall and the outer ring wall;
wherein, a recess is formed among the outer ring wall, the inner ring wall and the first terminal wall.

15. The network camera according to claim 14, wherein the casing further comprises:
a stopping portion connecting the side board or the outer ring wall, wherein the slot is formed between the stopping portion and a terminal portion of the inner ring wall;
wherein an inner diameter of the inner ring wall gradually shrinks along a direction towards the slot from the first terminal wall.

16. The network camera according to claim 15, wherein the stopping portion has a through hole, the engaging terminal comprises a protruding terminal portion, which passes through the through hole of the stopping portion.

17. The network camera according to claim 14, wherein the protruding portion further comprises:
a second terminal wall connected to the inner ring wall;
wherein the slot is an open ring-shaped slot, formed on the inner ring wall and not extended to a terminal surface of the second terminal wall.

18. The network camera according to claim 14, wherein the engaging flange directly contacts a terminal surface of the inner ring wall;
wherein the engaging terminal comprises a positioning flange having a first large diameter and a first small diameter, and the opening has a second large diameter and a second small diameter;
wherein, the positioning flange is disposed in the opening with the first large diameter being aligned with the second large diameter of the opening and the first small diameter being aligned with the second small diameter of the opening.

19. The network camera according to claim 13, wherein the engaging flange has a first large diameter and a first small diameter, and the opening of the protruding portion has a second large diameter and a second small diameter;
wherein, the engaging flange is disposed in the opening with the first large diameter being aligned with the second large diameter of the opening and the first small diameter being aligned with the second small diameter of the opening.

\* \* \* \* \*